(12) United States Patent
Umezawa et al.

(10) Patent No.: US 6,497,455 B1
(45) Date of Patent: Dec. 24, 2002

(54) VEHICLE SEAT WITH OCCUPANT PROTECTION DEVICES

(75) Inventors: Yoshinobu Umezawa, Tokyo (JP); Tadashi Tashiro, Tokyo (JP); Yoshio Hirakawa, Tokyo (JP); Noriyoshi Baba, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,422

(22) Filed: Sep. 29, 1999

(30) Foreign Application Priority Data

Sep. 30, 1998 (JP) .............................. 10-277871
Sep. 30, 1998 (JP) .............................. 10-277872

(51) Int. Cl.⁷ ................................................. B60N 2/42
(52) U.S. Cl. ................................ 297/452.18; 297/216.1
(58) Field of Search ........................ 297/216.1, 216.18, 297/452.18, 452.2, 452.55

(56) References Cited

U.S. PATENT DOCUMENTS 4,623,114 A * 11/1986 Nishino ............. 297/452.18 X
5,310,247 A * 5/1994 Fujimori et al. .... 297/452.18 X
5,468,050 A * 11/1995 Hall et al. .......... 297/452.18 X
5,782,537 A * 7/1998 Leistra et al. ....... 297/452.18 X
5,868,472 A * 2/1999 Grilliot et al. ......... 297/452.18

* cited by examiner

Primary Examiner—Peter R. Brown
(74) Attorney, Agent, or Firm—Martin A. Farber (57) ABSTRACT

A seat for a vehicle comprises a cushion frame member provided in a seat cushion, an outer seat supporting member provided under the seat cushion on the door side of the vehicle for connecting the seat with a vehicle floor, an inner seat supporting member provided under the seat cushion on the center side of the vehicle for connecting the seat with a vehicle floor, a front reinforcement member laterally provided under the front part of the seat cushion, connected with the cushion frame, connected at a door side end thereof with the outer seat supporting member and connected at a center side thereof with the inner seat supporting member, and a rear reinforcement member laterally provided under the rear part of the seat cushion, connected with the cushion frame, connected at the door side end thereof with the outer seat supporting member and connected at the center side end thereof with the inner seat supporting member. The seat thus constituted has a strong resistance to the deformation, thereby a seat occupant can be protected from incoming body components on an impact.

17 Claims, 11 Drawing Sheets

VEHICLE SEAT WITH OCCUPANT PROTECTION DEVICES

BACKGROUND OF THE INVENTION

1. Field of the Invention

The present invention relates to a vehicle seat and more particularly to a vehicle seat having safety devices to protect an occupant in an event of a side impact.

2. Background Art

Generally, when a side impact is applied to a vehicle, side body components such as a door, a center pillar, a side sill and the like are damaged and then the deformed door, the deformed center pillar and the like come into the passenger compartment of the vehicle. Then, an occupant sitting on a seat on the impacted side might be injured by the incoming body components.

Various countermeasures have been proposed and put into practical use such as reinforcing center pillars, side sills and the like or incorporating reinforcenment beams in doors to prevent these side body structures from coming into the passenger compartment and damaging an occupant sitting in a seat on the impact side. However, these countermeasures are still insufficient for protecting a seat occupant.

One solution is to reinforce the vehicle seat so as to withstand its deformation when the seat has an impact from such incoming side body members.

Figure 10:
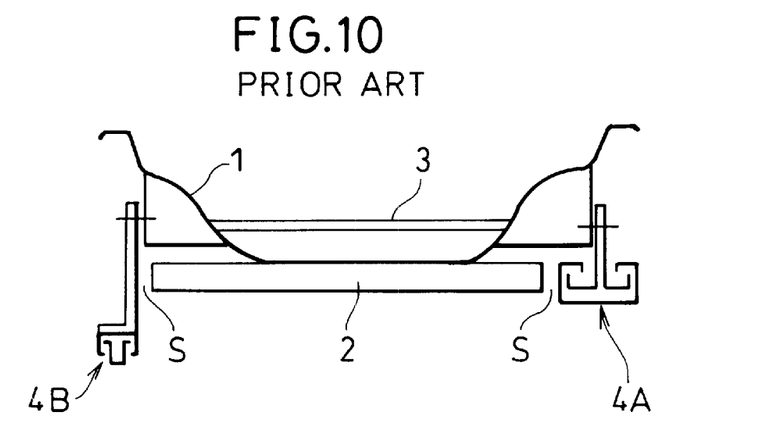
FIG. 10 is a front view of a vehicle seat according to a prior art.

As shown in FIG. 10, an example of a conventional seat has a pipe member 2 extending in the widthwise direction of the vehicle at the bottom of a cushion frame 1 constituting a seat cushion.

Further, there is provided a reinforcement 3 extending horizontally at the inner side of the cushion frame to protect an occupant from a frontal impact. When an impact is applied to the vehicle from front, an occupant sitting on the seat falls forward due to inertia force and as a result a downward force is generated at the front portion of the seat. The reinforcement 3 is for supporting the force from underneath.

In FIG. 10, numerals 4A, 4B denote a slide rail slidably movable in the forward and backward direction and connected with the cushion frame 1.

The pipe member 2 is secured to the cushion frame 1 but is not directly connected with the slide rail 4A, 4B for connecting the seat to the floor of the vehicle. Accordingly, on a side impact, these side rails 4A, 4B falls sideways, causing so-called "tumbling".

Further, due to the clearance gap "s" between both ends of the pipe member and the slide rail 4A or 4B, the traveling speed of the door which comes into the compartment on an impact can not be reduced.

Further, since the reinforcement 3 is just connected at both ends thereof with the inner wall of the cushion frame 1, the cushion frame 1 can not be prevented from being deformed due to a side impact.

SUMMARY OF THE INVENTION

It is an object to provide a vehicle seat capable of protecting the seat occupant by preventing the deformation of the seat in an event of a side impact.

Such vehicle seat comprises a cushion frame member provided in a seat cushion, an outer seat supporting member provided under the seat cushion on a door side of the vehicle for connecting the seat with a vehicle floor, an inner seat supporting member provided under the seat cushion on the center side of the vehicle for connecting the seat with a vehicle floor, a front reinforcement member laterally provided under the front part of the seat cushion, connected with the cushion frame, connected at a door side end thereof with the outer seat supporting member and connected at a center side thereof with the inner seat supporting member, and a rear reinforcement member laterally provided under the rear part of the seat cushion, connected with the cushion frame, connected at a door side end thereof with the outer seat supporting member and connected at a center side end thereof with the inner seat supporting member.

DESCRIPTION OF PREFERRED EMBODIMENTS

Figure 1:
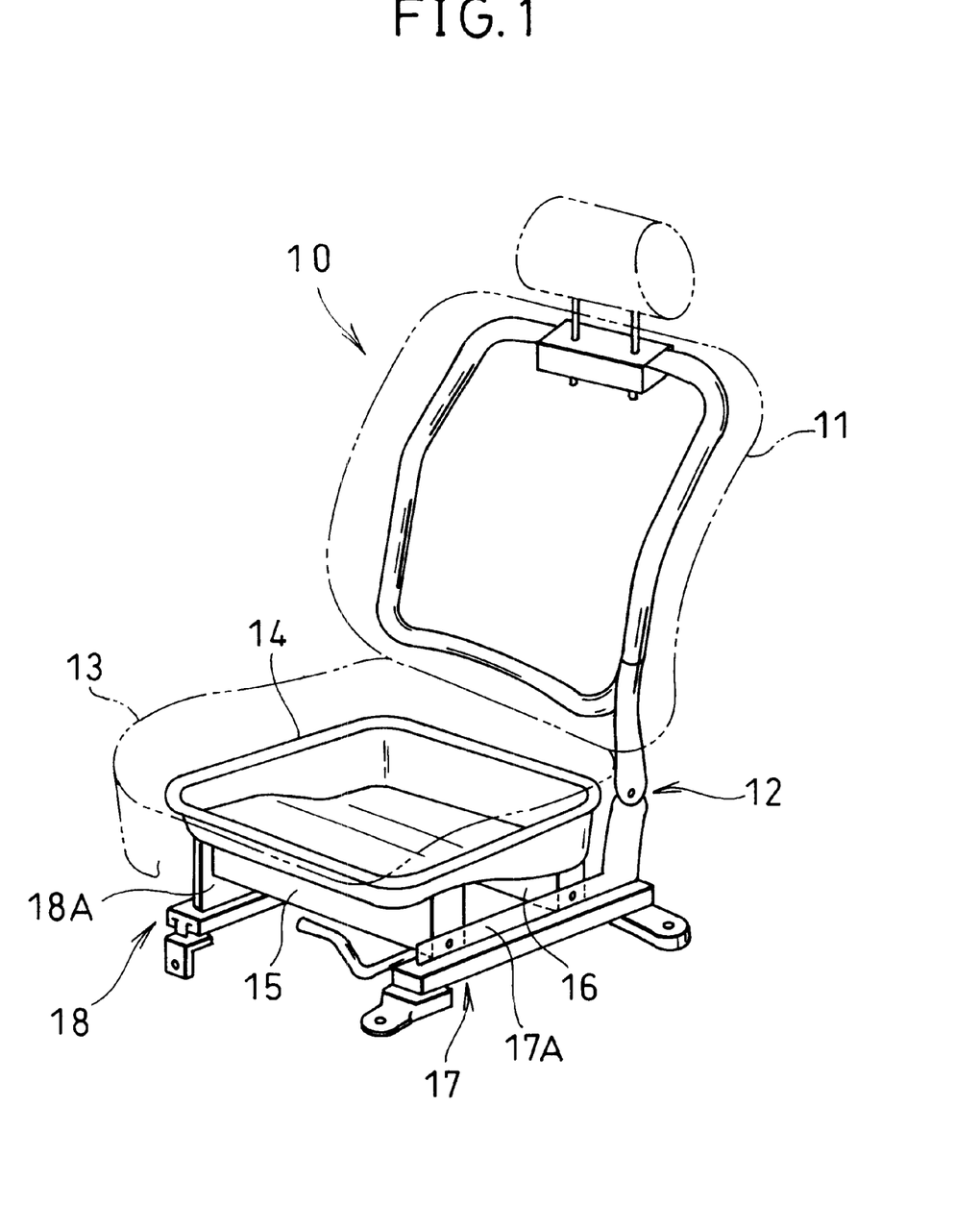
FIG. 1 is a perspective view showing an example of a vehicle seat having a safety device according to an embodiment of the present invention.

Referring to FIG. 1, numeral 10 denotes a vehicle seat which is constituted by a seat back 11 and a seat cushion 13 connected with the seat back 11 through a reclining device 12.

In this embodiment, the seat 10 shows a driver's seat of the right-hand drive vehicle and other seats illustrated in FIGS. 2 to 5 show a passenger seat.

Figure 2:
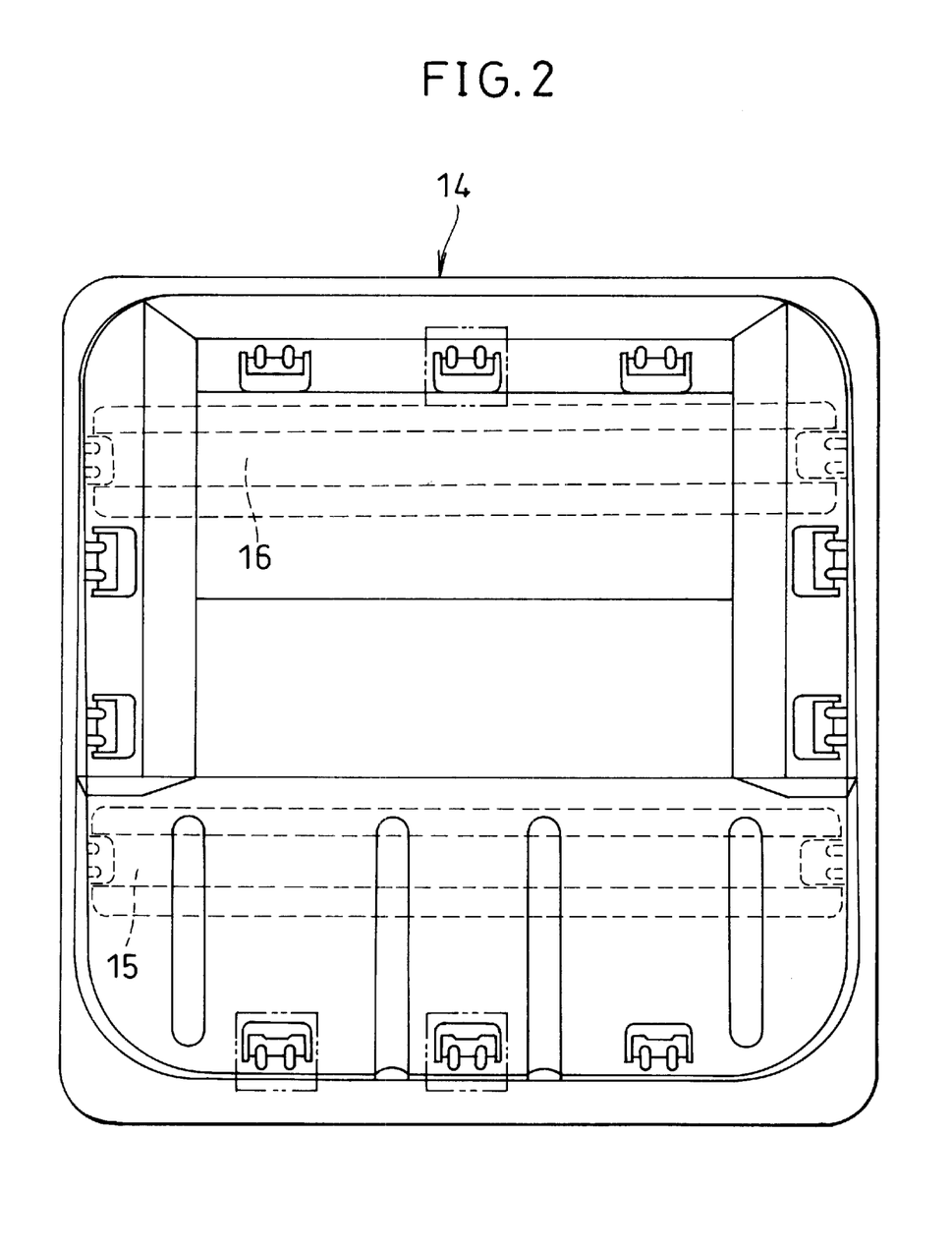
FIG. 2 is plan view showing a cushion pan equipped with reinforcement members.
Figure 4:
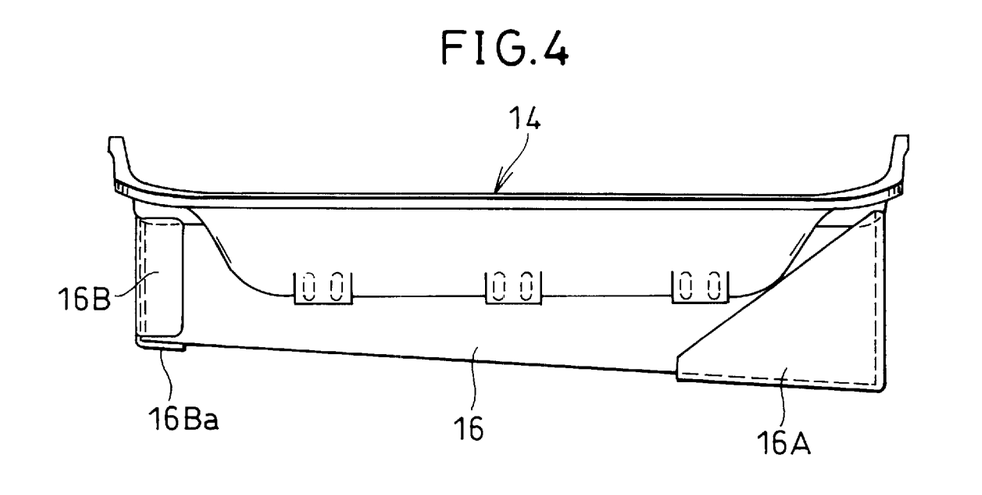
FIG. 4 is a rear view showing a cushion pan equipped with reinforcement members.
Figure 5:
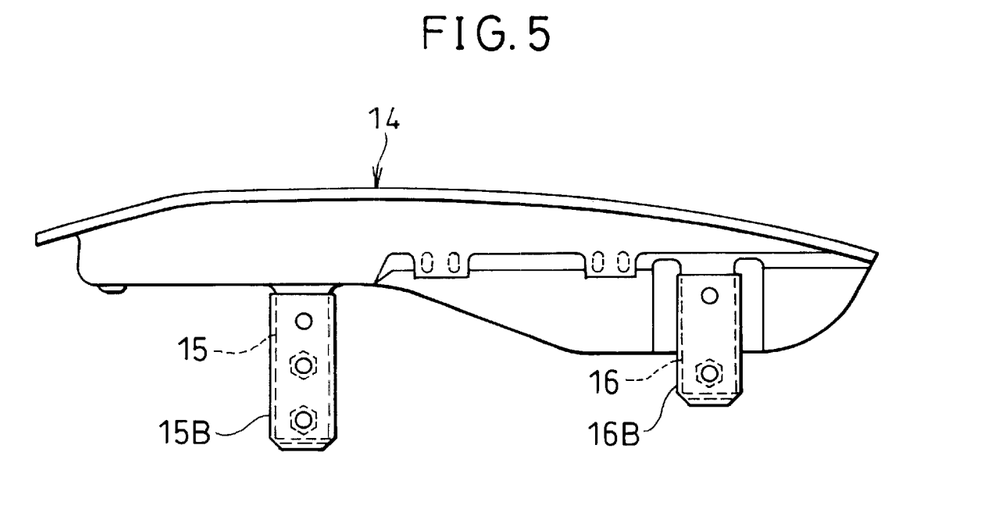
FIG. 5 is a left side view showing a cushion pan equipped with reinforcement members.

Inside of the seat cushion 13, as shown in FIGS. 2 and 4, there is provided a steel-made cushion pan 14 which is approximately square in plan shape and is convex downwardly. Further a steel-made, beam-shaped reinforcement member 15 is disposed in parallel with the widthwise (lateral) direction of the cushion pan 14 under the front bottom of the cushion pan 14. The upper surface of the reinforcement member 15 is secured by welding almost over the full lateral length thereof to the bottom surface of the cushion pan 14.

Further, a steel-made, beam-shaped reinforcement member 16 is disposed in parallel with the widthwise direction of the cushion pan 14 under the rear bottom of the cushion pan 14 and its upper surface is secured by welding almost over the full length thereof to the bottom surface of the cushion pan 14.

Figure 9:
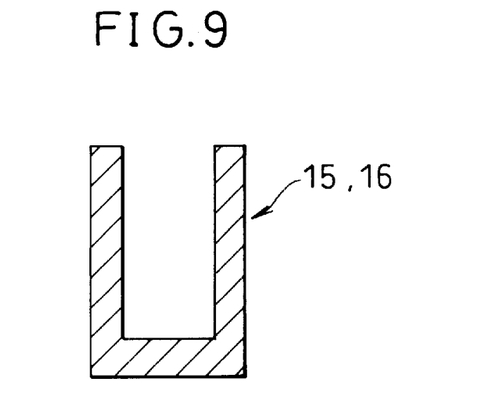
FIG. 9 is a cross sectional view showing an example of reinforcement members.

FIG. 9 shows an example of the reinforcement members 15, 16 having a U-shaped cross section.

Figure 3:
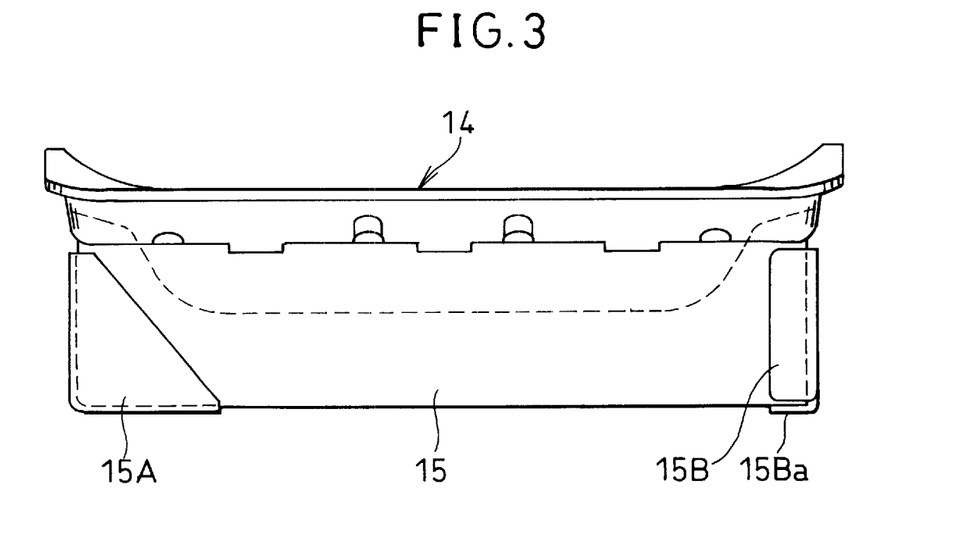
FIG. 3 is a front view showing a cushion pan equipped with reinforcement members.

The reinforcement member 15, as shown in FIG. 3, is rigidly connected at the center side (left side in FIG. 3) end thereof with a bracket 15A in such a manner that the bracket 15A wraps around the end of the reinforcement member 15 from underneath. The bracket 15A has a box-shape and is right triangular in a front shape. Further, the reinforcement member 15 is rigidly connected at the door side (right side in FIG. 3) end thereof with a bracket 15B having a U-shaped cross section in such a manner that a flange 15B$a$ integrally formed with the bracket 15B abuts against the reinforcement member 15 from underneath.

Similarly, the reinforcement member 16, as shown in FIG. 4) is rigidly connected at the center side (right side in FIG. 4) end thereof with a box-shaped triangular bracket 16A in such a manner that the bracket 16A wraps around the end of the reinforcement member 16 from underneath and is rigidly connected at the door side (left side in FIG. 4) end thereof with a bracket 16B having a U-shaped cross section in such a manner that a flange 16B$a$ integrally formed with the bracket 16B abuts against the reinforcement member 16 from underneath.

Figure 6:
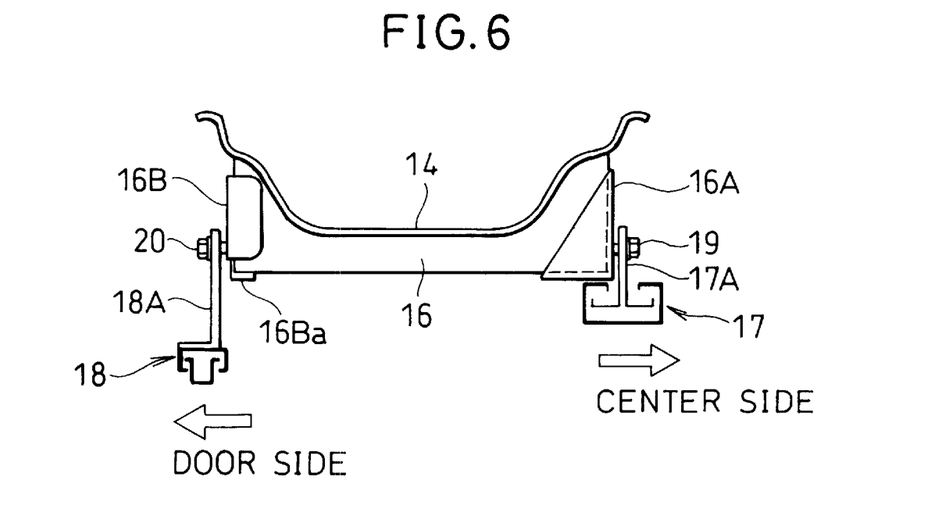
FIG. 6 is a rear view showing a state of installing reinforcement members and seat adjusters.

As illustrated in FIG. 1, the reinforcement members 15, 16 are disposed between a seat adjuster 17 installed in the lengthwise direction of the vehicle on the center side of the floor of the body and a seat adjuster 18 installed in the lengthwise direction of the vehicle on the door side. Further, the reinforcement members 15, 16 are connected at the center side ends thereof with a slider 17A of the seat adjuster 17, respectively. Similarly, the reinforcement members 15, 16 are connected at the door side ends thereof with a slider 18A of the seat adjuster 18, respectively. Since the cushion pan 14 is connected with the reinforcement members 15, 16, the cushion 13 is slidably supported by the seat adjusters 17, 18. FIG. 6 indicates the state of the reinforcement members 15, 16 connected with the seat adjusters 17, 18.

In FIG. 6, the reinforcement member 16 is rigidly connected at the center side end thereof by at least one bolt 19 with the slider 17A of the seat adjuster 17 through the triangular bracket 16A.

Further, the reinforcement member 16 is secured at the door side thereof to the slider 18A of the seat adjuster 18 by at least one bolt 20 through the bracket 16B.

Similarly, the reinforcement member 15 is secured at both ends thereof to the sliders 17A, 18A respectively.

When a side impact is applied, the impact is supported by the reinforcement members 15, 16 respectively, thereby the cushion pan 14 reinforced by those reinforcement members 15, 16 is prevented from being deformed and as a result the shape of the seat is secured.

As the cross section area of the reinforcement members 15, 16 becomes large, the reinforcement member 15, 16 support a larger impact and the incoming door gives a smaller deformation to the vehicle seat 10, this resulting in protecting the seat occupant from injuries.

Further, even when the side impact is applied obliquely with respect to the reinforcement members 15, 16, since the reinforcement members 15, 16 are directly connected at both ends thereof with the sliders 17A, 18A respectively, so-called "tumbling" of the seat adjusters 17, 18 can be prevented and accordingly the side impact applied to the vehicle can be securely supported. Further, since there is no clearance gap between the reinforcement members 1 5, 16 and the seat adjusters 17, 18, the incoming door can be blocked.

Figure 7:
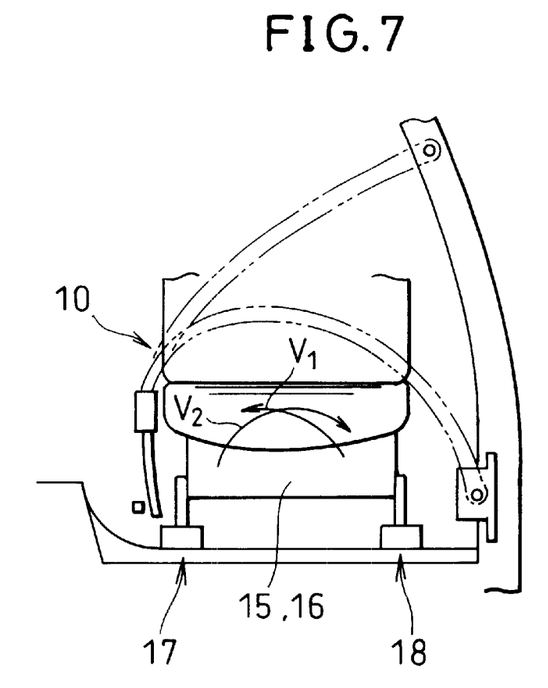
FIG. 7 is an explanatory view showing a tearing-off load.

Further, when so-called "tearing off" load $v_1$ which intends to turn over the seat is generated by a side impact, as illustrated in FIG. 7, the seat 10 can be prevented from being turned over.

Figure 8:
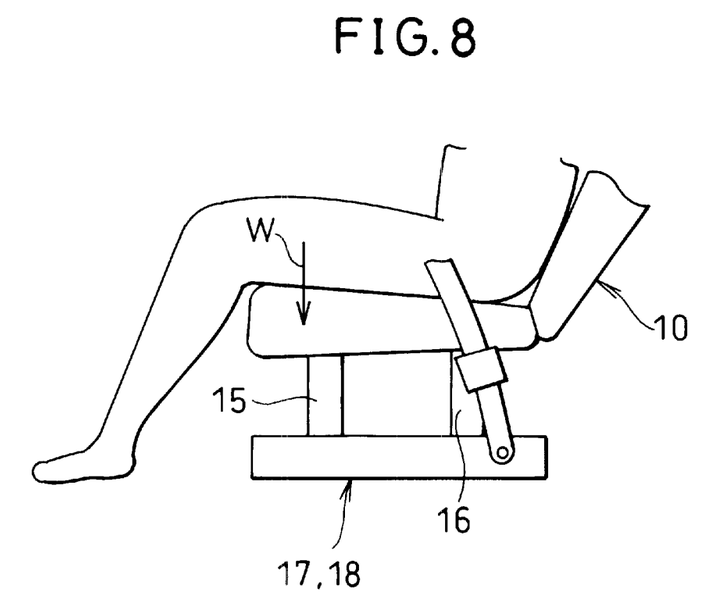
FIG. 8 is an explanatory view showing a downward load applied to the front portion of a vehicle seat.

Further, when a frontal impact is applied, as shown in FIG. 8, an occupant sitting on the seat 10 falls forwardly due to the impact and as a result a downward load w is applied to the front part of the cushion 13. Since the whole upper surface of the reinforcement member 15 is secured to the bottom surface of the cushion pan 14 and further both ends of the reinforcement member 15 are rigidly connected with the sliders 17A, 18A, this downward load w can be supported and the cushion pan 14, i.e., the vehicle seat 10 can be prevented from being deformed, thereby the seat occupant can be protected.

Further, even when a frontal impact is applied to the vehicle and so-called "tearing off" load $v_2$ which intends to lift the seat up is generated by a tightened inner seat belt, as shown in FIG. 7, the seat 10 can be prevented from being turned over.

Further, since the reinforcement members 15, 16 are fixed at the center side ends thereof to the sliders 17A, 18A through the triangular brackets 15A, 16A, when a side force generated from the impact is applied to the seat 10 to push the seat 10 down toward the center side, the reinforcement members 15, 16 can be prevented from being bent due to the bending moment of that force.

Figure 11:
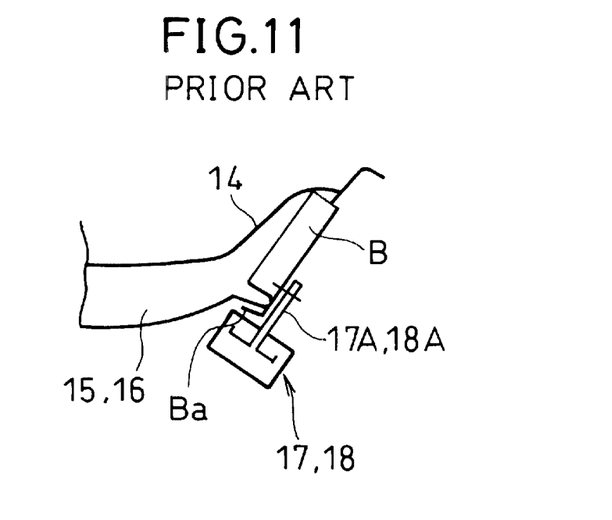
FIG. 11 is an explanatory view showing a state of deformed reinforcement member.

That is, in case where the center side end of the reinforcement members 15, 16 is, for example, secured to the sliders 17A, 18A through a bracket,shaped like the bracket 15B or 16B, there is a fear that the seat adjusters 17, 18 fall sideways due to a bending force exerted on the reinforcement member 15 or 16 around a supporting point located at the edge portion of the flange Ba abutting against the lower surface of the bracket B, as shown in FIG. 11.

However, according to the vehicle seat described in this embodiment, since the triangular brackets 15A, 16A wrap around the center side end of the reinforcement members 15, 16 with a large contact area respectively, the reinforcement members 15, 16 can withstand the bending force, thereby the seat adjusters 17, 18 can be prevented from falling sideways.

Figure 12:
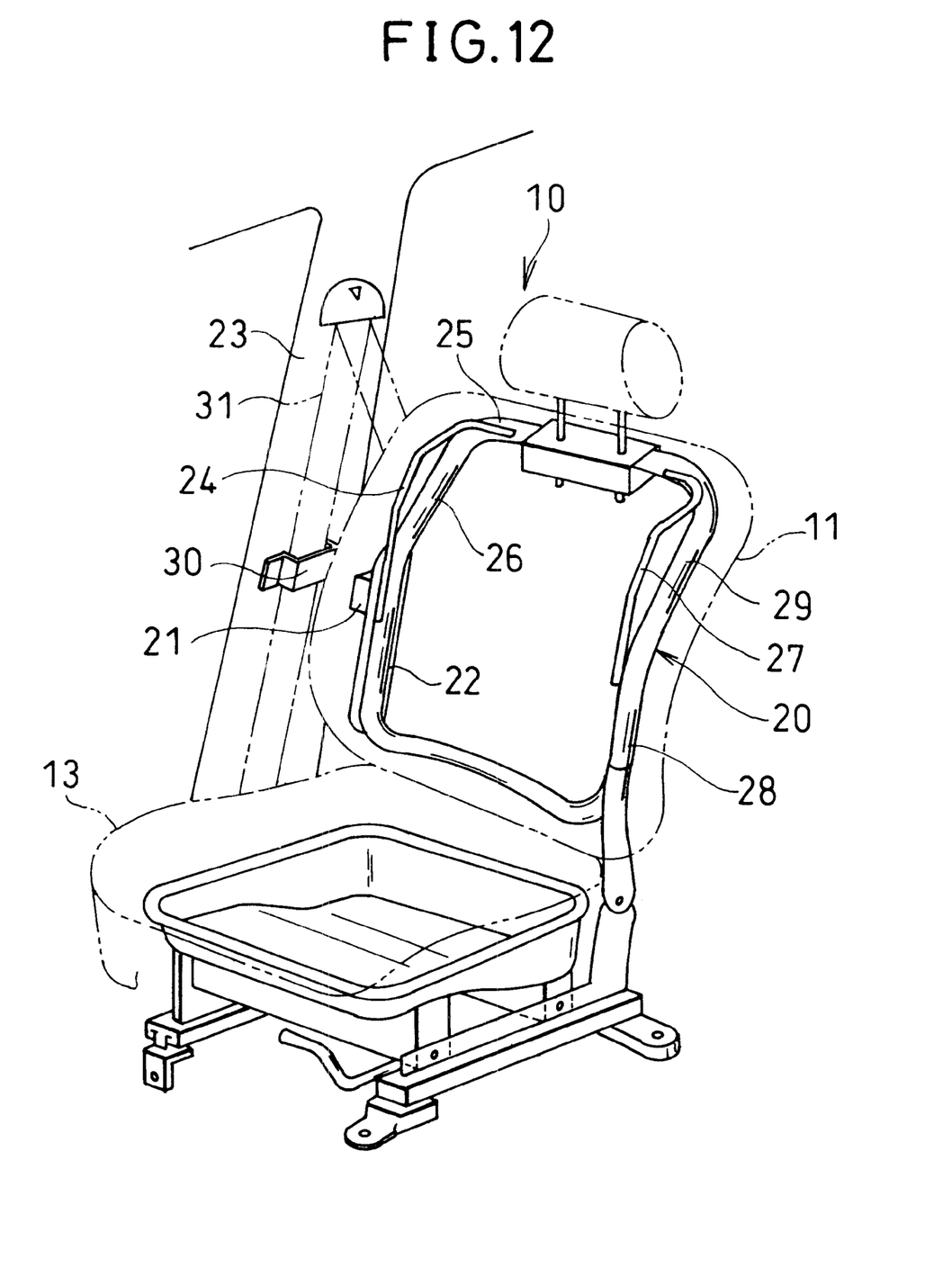
FIG. 12 is a perspective view showing a vehicle seat according to a second embodiment of the present invention.
Figure 13:
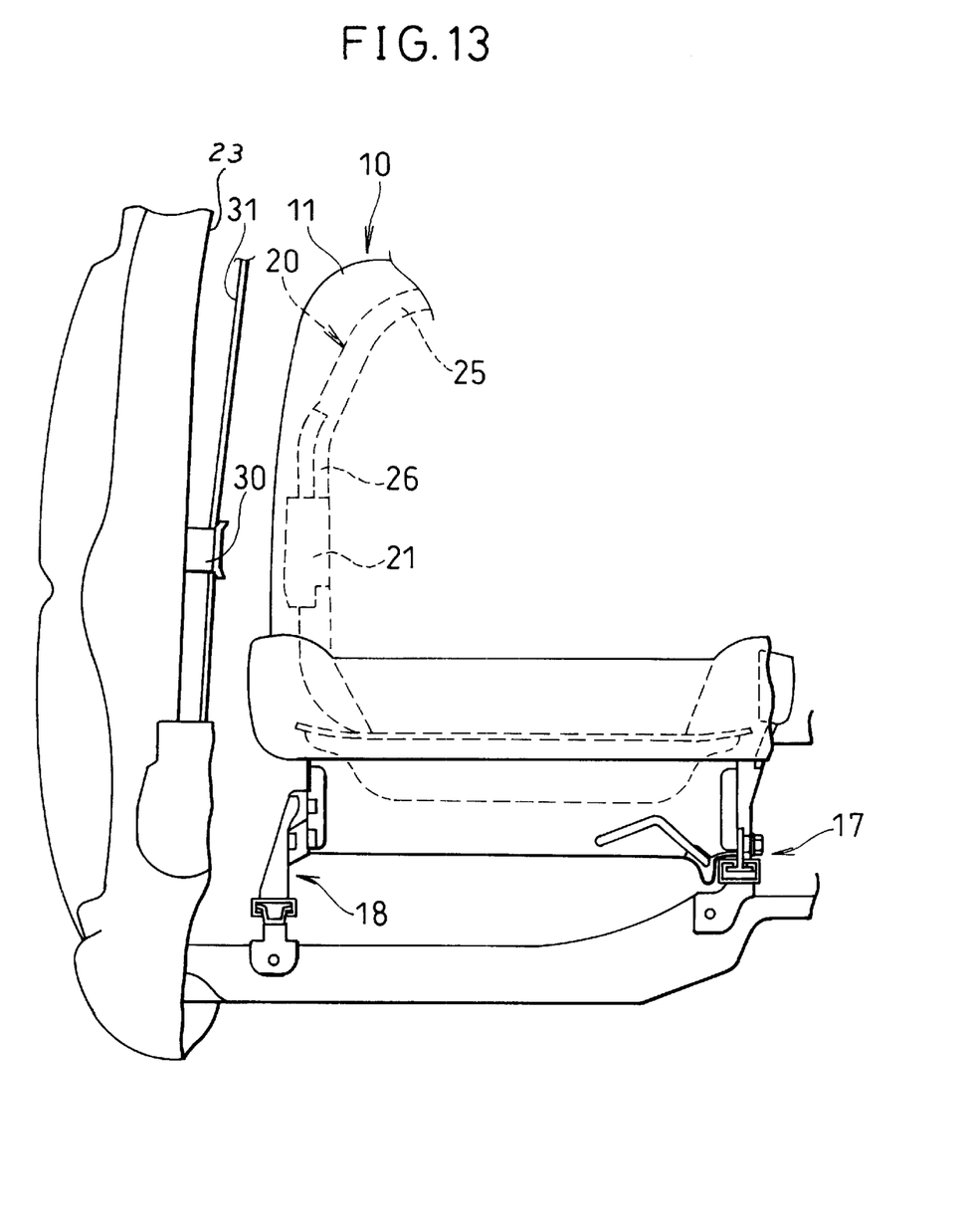
FIG. 13 is a partially enlarged view of the vehicle seat shown in FIG. 12.

FIGS. 12 and 13 show another example of a vehicle seat on the driver's side of a right hand drive vehicle according to a second embodiment of the present invention.

Figure 14:
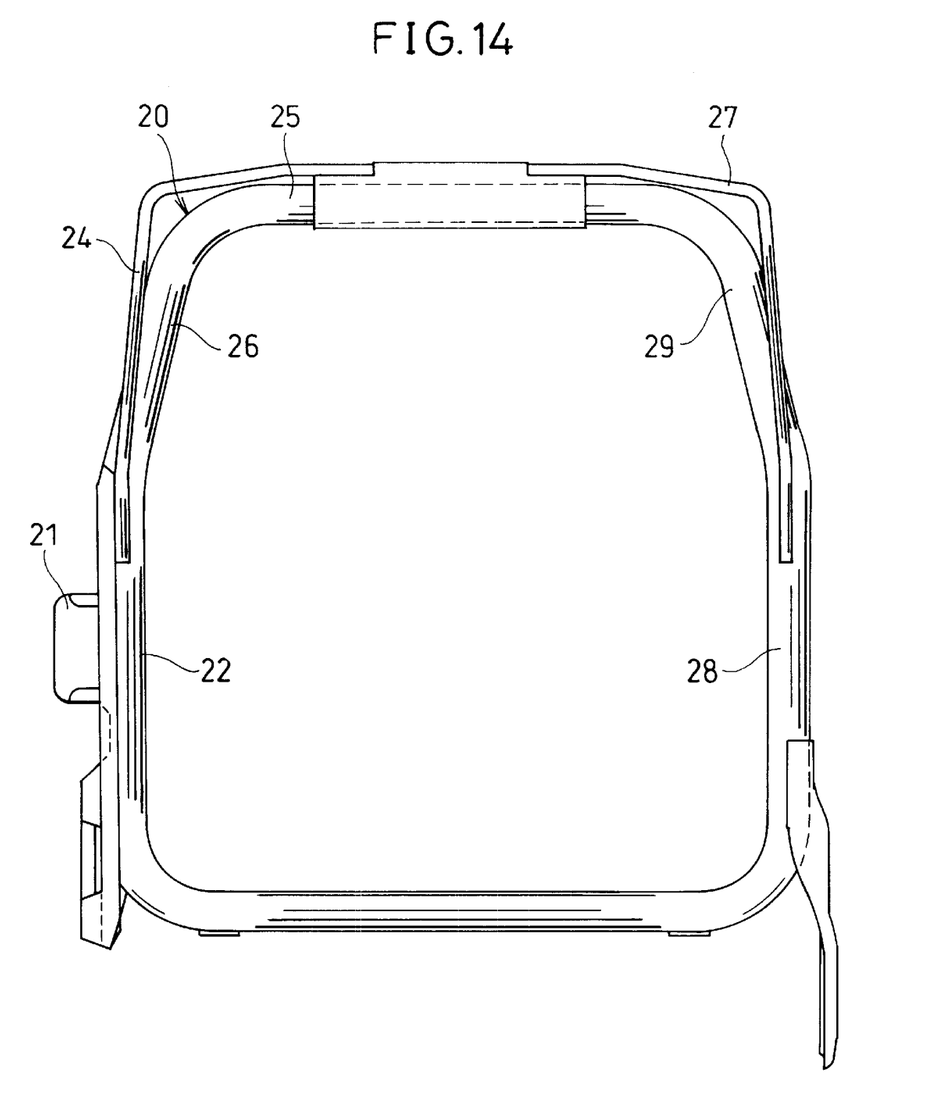
FIG. 14 is a front view showing an installation state of a side bracket.
Figure 15:
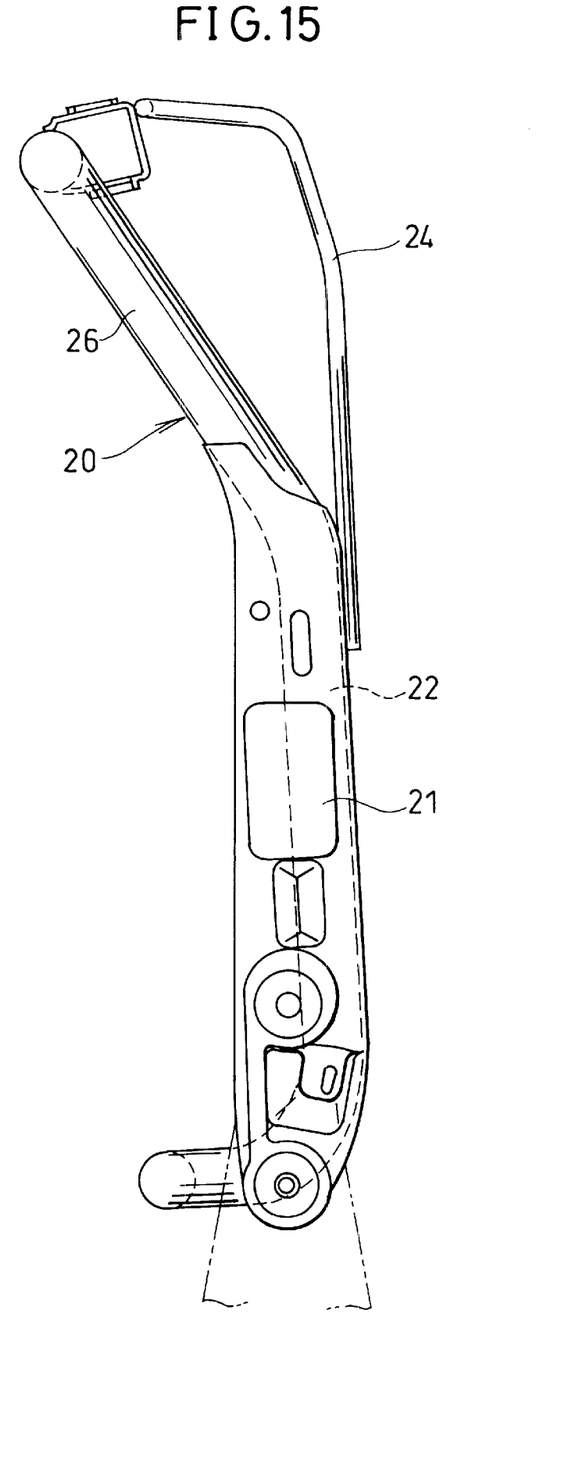
FIG. 15 is a side view showing an installation state of a side bracket.

FIGS. 14 and 15 show a support frame 20 which is formed inside of the seat back 11 in such a manner as extending along the outline of the seat back 11. Further, a side bracket 21 is secured to a right lower frame 22 of the support frame 20 in such a manner as opposing to the inner wall surface of the center pillar 23.

As shown in FIG. 13, the side bracket 21 is disposed inside of the seat skin of the seat back 11 and therefore can not be seen from outside.

Further, a right side support frame 24 is connected at the upper end thereof with a top frame 25 of the support frame 20 and at the lower end thereof with the intermediate part of the right lower frame 22 of the support frame 20 in such a manner as hanging over a right upper frame 26 of the support frame 20. The right upper frame 26 is bent backward along the back of the seat occupant.

Similarly, a left side support frame 27 is connected at the upper end thereof with the top frame 25 of the support frame 20 and at the lower end thereof with the intermediate part of the left lower frame 28 of the support frame 20 in such a manner as hanging over a left upper frame 29 of the support frame 20. The right upper frame 29 is bent backward along the back of the seat occupant.

These right and left side support frames 24 and 27 form a right and left side bolsters at the upper portion of the seat back 11 so as to support the shoulders of the occupant sitting on the seat 10.

On the inner wall surface of the center pillar 23, as indicated in FIGS. 12 and 13, a pushing bracket 30 is disposed at the position opposite to the side bracket 21 installed in the seat back 11.

The pushing bracket 30 has a guide slit for allowing a seat belt 31 to pass therethrough up and down. That is, the pushing bracket 30 has another function as a webbing guide of the seat belt 31.

Figure 16:
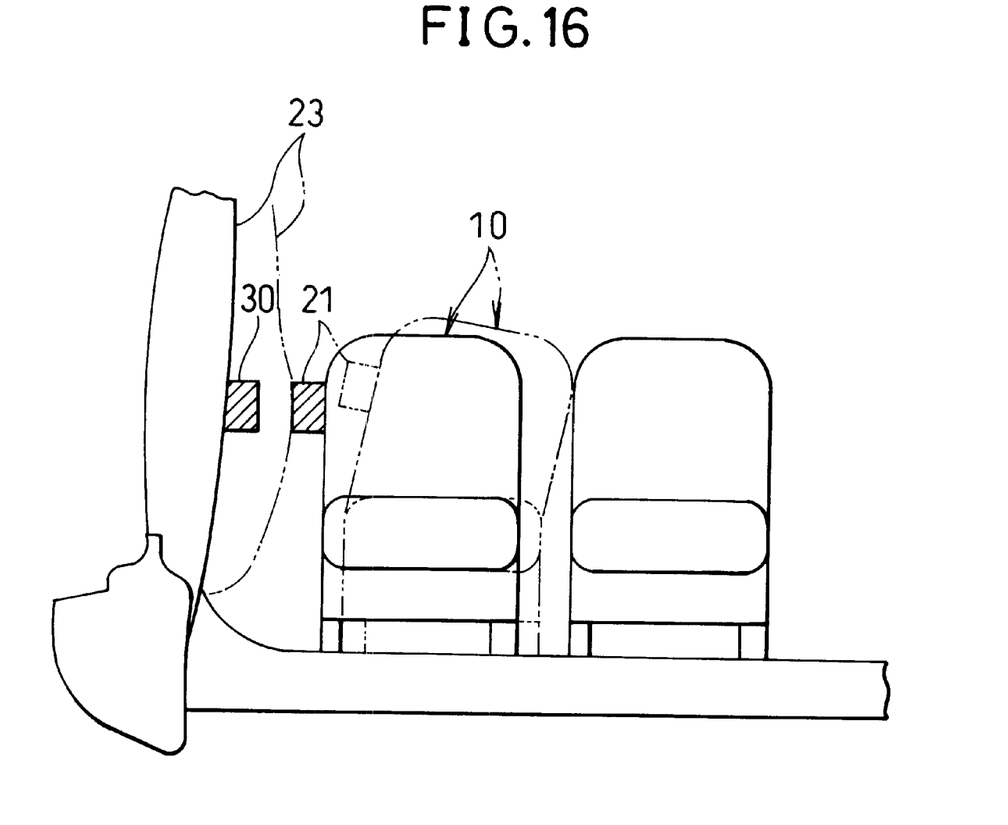
FIG. 16 is an explanatory view showing a movement of a vehicle seat according to the second embodiment.

Upon a side impact, when the side body structures such as the center pillar, the door, the side sill and the like come in towards the center of the vehicle, the pushing bracket 30 mounted in the center pillar 23 abuts against the side bracket 21 of the seat back 11 and as a result the seat 10 is pushed to move toward the center of the vehicle without being subjected to deformation and without delay with respect to the incoming side body structures, as shown in FIG. 16.

Then, since the occupant sitting on the seat 10 is surely supported at his or her shoulders by the right and left side support frames 24, 27 from both sides, the seat occupant is also moved toward the center of the vehicle together with the vehicle seat 10, thereby it is possible to reduce the impact of the incoming center pillar 23 or the like.

In place of attaching the pushing bracket 30 to the center pillar 23, a projection may be shaped opposite to the side bracket 21 on the inner wall surface of the center pillar 23 so as to abut against the side bracket 21 on a side impact.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A seat for a vehicle having a seat cushion and a seat back, comprising:
    a cushion frame member provided in said seat cushion;
    an outer seat supporting member provided under said seat cushion on a door side of said vehicle for movably connecting said seat with a vehicle floor;
    an inner seat supporting member provided under said seat cushion on a center side of said vehicle for movably connecting said seat with the vehicle floor; and
    at least one laterally extending reinforcement member directly connected with a lower part of said cushion frame member in a lateral direction, said reinforcement member connected at a door side end thereof with said outer seat supporting member and connected at a center side end thereof with said inner seat supporting member, so that the cushion frame member reinforced by said reinforcement member is preventable from being deformed when a side impact is applied to the vehicle.

2. The seat according to claim 1, wherein the cushion frame member is a cushion pan.

3. A seat for a vehicle having a seat cushion and a seat back, comprising:
    a cushion frame member provided in said seat cushion;.
    an outer seat supporting member provided under said seat cushion on a door side of said vehicle for movably connecting said seat with a vehicle floor;
    an inner seat supporting member provided under said seat cushion on a center side of said vehicle for movably connecting said seat with the vehicle floor;
    a front laterally extending reinforcement member provided under the front part of said seat cushion and directly connected with said cushion frame member, said front reinforcement member connected at a door side end thereof with said outer seat supporting member and connected at a center side end thereof with said inner seat supporting member; and
    a rear laterally extending reinforcement member provided under the rear part of said seat cushion and directly connected with said cushion frame member, said rear reinforcement member connected at a door side end thereof with said outer seat supporting member and connected at a center side end thereof with said inner seat supporting member,
    whereby said cushion frame member reinforced by said reinforcement members is preventable from being deformed when a side impact is applied to the vehicle.

4. The seat according to claim 3, wherein the cushion frame member is a cushion pan.

5. A seat for a vehicle having a seat cushion and a seat back, comprising:
    a cushion frame member provided in said seat cushion;
    an outer seat supporting member provided under said seat cushion on a door side of said vehicle for connecting said seat with a vehicle floor;
    an inner seat supporting member provided under said seat cushion on a center side of said vehicle for connecting said seat with the vehicle floor; and
    at least one reinforcement member laterally provided under said seat cushion and connected with said cushion frame member, said reinforcement member connected at a door side end thereof with said outer seat supporting member and connected at a center side end thereof with said inner seat supporting member, wherein
    said reinforcement member is connected at the center side end thereof with said inner seat supporting member via a box-shaped front bracket which is triangular in a front shape and wraps around said end from underneath.

6. A seat for a vehicle having a seat cushion and a seat back, comprising:
    a cushion frame member provided in said seat cushion;
    an outer seat supporting member provided under said seat cushion on a door side of said vehicle for connecting said seat with a vehicle floor;
    an inner seat supporting member provided under said seat cushion on a center side of said vehicle for connecting said seat with the vehicle floor;
    a front reinforcement member laterally provided under the front part of said seat cushion and connected with said cushion frame member, said front reinforcement member connected at a door side end thereof with said outer seat supporting member and connected at a center side end thereof with said inner seat supporting member; and a rear reinforcement member laterally provided under the rear part of said seat cushion and connected with said cushion frame member, said rear reinforcement member connected at a door side end thereof with said outer seat supporting member and connected at a center side end thereof with said inner seat supporting member, wherein said front reinforcement member is connected at the center side end thereof with said inner seat supporting member via a box-shaped front bracket which is triangular in a front shape and wraps around said end from underneath.

7. A seat for a vehicle having a seat cushion and a seat back, comprising:

a cushion frame member provided in said seat cushion;

an outer seat supporting member provided under said seat cushion on a door side of said vehicle for connecting said seat with a vehicle floor;

an inner seat supporting member provided under said seat cushion on a center side of said vehicle for connecting said seat with the vehicle floor;

a front reinforcement member laterally provided under the front part of said seat cushion and connected with said cushion frame member, said front reinforcement member connected at a door side end thereof with said outer seat supporting member and connected at a center side end thereof with said inner seat supporting member; and a rear reinforcement member laterally provided under the rear part of said seat cushion and connected with said cushion frame member, said rear reinforcement member connected at a door side end thereof with said outer seat supporting member and connected at a center side end thereof with said inner seat supporting member, wherein said rear reinforcement member is connected at the center side end thereof with said inner seat supporting member via a box-shaped rear bracket which is triangular in a front shape and wraps around said end from underneath.

8. A seat for a vehicle having a seat cushion and a seat back, comprising:

a cushion frame member provided in said seat cushion;

an outer seat supporting member provided under said seat cushion on a door side of said vehicle for movably connecting said seat with a vehicle floor;

an inner seat supporting member provided under said seat cushion on a center side of said vehicle for movably connecting said seat with the vehicle floor; and at least one reinforcement member directly connected with a lower part of said cushion frame member in a lateral direction, said reinforcement member connected at a door side end thereof with said outer seat supporting member and connected at a center side end thereof with said inner seat supporting member, so that the cushion frame member reinforced by said reinforcement member is preventable from being deformed when a side impact is applied to the vehicle; wherein said reinforcement member is connected at the center side end thereof with said inner seat supporting member via a box-shaped front bracket which is triangular in a front shape and wraps around said end from underneath.

9. A seat for a vehicle having a seat cushion and a seat back, comprising:

a cushion frame member provided in said seat cushion;

an outer seat supporting member provided under said seat cushion on a door side of said vehicle for movably connecting said seat with a vehicle floor;

an inner seat supporting member provided under said seat cushion on a center side of said vehicle for movably connecting said seat with the vehicle floor;

a front reinforcement member laterally provided under the front part of said seat cushion and directly connected with said cushion frame member, said front reinforcement member connected at a door side end thereof with said outer seat supporting member and connected at a center side end thereof with said inner seat supporting member; and a rear reinforcement member laterally provided under the rear part of said seat cushion and directly connected with said cushion frame member, said rear reinforcement member connected at a door side end thereof with said outer seat supporting member and connected at a center side end thereof with said inner seat supporting member, whereby said cushion frame member reinforced by said reinforcement members is preventable from being deformed when a side impact is applied to the vehicle; and wherein said front reinforcement member is connected at the center side end thereof with said inner seat supporting member via a box-shaped front bracket which is triangular in a front shape and wraps around said end from underneath.

10. A seat for a vehicle having a seat cushion and a seat back, comprising:

a cushion frame member provided in said seat cushion;

an outer seat supporting member provided under said seat cushion on a door side of said vehicle for movably connecting said seat with a vehicle floor;

an inner seat supporting member provided under said seat cushion on a center side of said vehicle for movably connecting said seat with the vehicle floor;

a front reinforcement member laterally provided under the front part of said seat cushion and directly connected with said cushion frame member, said front reinforcement member connected at a door side end thereof with said outer seat supporting member and connected at a center side end thereof with said inner seat supporting member; and a rear reinforcement member laterally provided under the rear part of said seat cushion and directly connected with said cushion frame member, said rear reinforcement member connected at a door side end thereof with said outer seat supporting member and connected at a center side end thereof with said inner seat supporting member, whereby said cushion frame member reinforced by said reinforcement members is preventable from being deformed when a side impact is applied to the vehicle; and wherein said rear reinforcement member is connected at the center side end thereof with said inner seat supporting member via a box-shaped rear bracket which is triangular in a front shape and wraps around said end from underneath.

11. A seat for a vehicle having a seat cushion and a seat back, comprising:
- a cushion frame member provided in said seat cushion;
- an outer seat supporting member provided under said seat cushion on a door side of said vehicle for movably connecting said seat with a vehicle floor;
- an inner seat supporting member provided under said seat cushion on a center side of said vehicle for movably connecting said seat with the vehicle floor; and
- at least one reinforcement member directly connected with a lower part of said cushion frame member in a lateral direction, said reinforcement member connected at a door side end thereof with said outer seat supporting member and connected at a center side end thereof with said inner seat supporting member, so that the cushion frame member reinforced by said reinforcement member is preventable from being deformed when a side impact is applied to the vehicle;
- wherein the cushion frame member is a cushion pan; and wherein
- the cushion pan has a bottom surface, to which bottom surface said reinforcement member is secured by welding almost over the full lateral length of the reinforcement member.

12. A seat for a vehicle having a seat cushion and a seat back, comprising:
- a cushion frame member provided in said seat cushion;
- an outer seat supporting member provided under said seat cushion on a door side of said vehicle for movably connecting said seat with a vehicle floor;
- an inner seat supporting member provided under said seat cushion on a center side of said vehicle for movably connecting said seat with the vehicle floor;
- a front reinforcement member laterally provided under the front part of said seat cushion and directly connected with said cushion frame member, said front reinforcement member connected at a door side end thereof with said outer seat supporting member and connected at a center side end thereof with said inner seat supporting member; and
- a rear reinforcement member laterally provided under the rear part of said seat cushion and directly connected with said cushion frame member, said rear reinforcement member connected at a door side end thereof with said outer seat supporting member and connected at a center side end thereof with said inner seat supporting member,
- whereby-said cushion frame member reinforced by said reinforcement members is preventable from being deformed when a side impact is applied to the vehicle;
- wherein the cushion frame member is a cushion pan; and wherein
- the cushion pan has a bottom surface, to which bottom surface said reinforcement members are secured by welding almost over the full lateral length of the reinforcement members.

13. A seat for a vehicle having a seat cushion and a seat back, comprising:
- a cushion frame member provided in said seat cushion;
- an outer seat supporting member provided under said seat cushion on a door side of said vehicle for movably connecting said seat with a vehicle floor;
- an inner seat supporting member provided under said seat cushion on a center side of said vehicle for movably connecting said seat with the vehicle floor; and
- at least one reinforcement member laterally connected with a lower part of said cushion frame member, said reinforcement member connected at a door side end thereof with said outer seat supporting member and connected at a center side end thereof with said inner seat supporting member, so that the cushion frame member reinforced by said reinforcement member is preventable from being deformed when a side impact is applied to the vehicle; and
- said reinforcement member is connected at the center side end thereof with said inner seat supporting member via a box-shaped front bracket which is triangular in a front shape and wraps around said end from underneath.

14. A seat for a vehicle having a seat cushion and a seat back, comprising:
- a cushion frame member provided in said seat cushion;
- an outer seat supporting member provided under said seat cushion on a door side of said vehicle for movably connecting said seat with a vehicle floor;
- an inner seat supporting member provided under said seat cushion on a center side of said vehicle for movably connecting said seat with the vehicle floor;
- a front reinforcement member laterally provided under the front part of said seat cushion and connected with said cushion frame member, said front reinforcement member connected at a door side end thereof with said outer seat supporting member and connected at a center side end thereof with said inner seat supporting member; and
- a rear reinforcement member laterally provided under the rear part of said seat cushion and connected with said cushion frame member, said rear reinforcement member connected at a door side end thereof with said outer seat supporting member and connected at a center side end thereof with said inner seat supporting member;
- whereby said cushion frame member reinforced by said reinforcement members is preventable from being deformed when a side impact is applied to the vehicle; and
- said front reinforcement member is connected at the center side end thereof with said inner seat supporting member via a box-shaped front bracket which is triangular in a front shape and wraps around said end from underneath.

15. A seat for a vehicle having a seat cushion and a seat back, comprising:
- a cushion frame member provided in said seat cushion;
- an outer seat supporting member provided under said seat cushion on a door side of said vehicle for movably connecting said seat with a vehicle floor;
- an inner seat supporting member provided under said seat cushion on a center side of said vehicle for movably connecting said seat with the vehicle floor;
- a front reinforcement member laterally provided under the front part of said seat cushion and connected with said cushion frame member, said front reinforcement member connected at a door side end thereof with said outer seat supporting member and connected at a center side end thereof with said inner seat supporting member; and
- a rear reinforcement member laterally provided under the rear part of said seat cushion and connected with said cushion frame member, said rear reinforcement member connected at a door side end thereof with said outer seat supporting member and connected at a center side end thereof with said inner seat supporting member;

whereby said cushion frame member reinforced by said reinforcement members is preventable from being deformed when a side impact is applied to the vehicle; and said rear reinforcement member is connected at the center side end thereof with said inner seat supporting member via a box-shaped rear bracket which is triangular in a front shape and wraps around said end from underneath.

16. A seat for a vehicle having a seat cushion and a seat back, comprising:

a cushion frame member provided in said seat cushion;

an outer seat supporting member provided under said seat cushion on a door side of said vehicle for movably connecting said seat with a vehicle floor;

an inner seat supporting member provided under said seat cushion on a center side of said vehicle for movably connecting said seat with the vehicle floor; and at least one reinforcement member laterally connected with a lower part of said cushion frame member, said reinforcement member connected at a door side end thereof with said outer seat supporting member and connected at a center side end thereof with said inner seat supporting member, so that the cushion frame member reinforced by said reinforcement member is preventable from being deformed when a side impact is applied to the vehicle; wherein the cushion frame member is a cushion pan; and wherein the cushion pan has a bottom surface, to which bottom surface said reinforcement member is secured by welding almost over the full lateral length of the reinforcement member.

17. A seat for a vehicle having a seat cushion and a seat back, comprising:

a cushion frame member provided in said seat cushion;

an outer seat supporting member provided under said seat cushion on a door side of said vehicle for movably connecting said seat with a vehicle floor;

an inner seat supporting member provided under said seat cushion on a center side of said vehicle for movably connecting said seat with the vehicle floor;

a front reinforcement member laterally provided under the front part of said seat cushion and connected with said cushion frame member, said front reinforcement member connected at a door side end thereof with said outer seat supporting member and connected at a center side end thereof with said inner seat supporting member; and a rear reinforcement member laterally provided under the rear part of said seat cushion and connected with said cushion frame member, said rear reinforcement member connected at a door side end thereof with said outer seat supporting member and connected at a center side end thereof with said inner seat supporting member;

whereby said cushion frame member reinforced by said reinforcement members is preventable from being deformed when a side impact is applied to the vehicle; wherein the cushion frame member is a cushion pan; and wherein the cushion pan has a bottom surface, to which bottom surface said reinforcement members are secured by welding almost over the full lateral length of the reinforcement members.

* * * * *